United States Patent [19]

Pipper et al.

[11] Patent Number: 4,816,557
[45] Date of Patent: Mar. 28, 1989

[54] REMOVAL OF CAPROLACTAM AND OLIGOMERS THEREOF FROM NYLON GRANULES CONTAINING SAME

[75] Inventors: Gunter Pipper, Bad Duerkheim; Claus Cordes, Weisenheim, both of Fed. Rep. of Germany

[73] Assignee: Basf Aktiengesellschaft, Ludwigshafen, Fed. Rep. of Germany

[21] Appl. No.: 167,250

[22] Filed: Mar. 11, 1988

[30] Foreign Application Priority Data

Mar. 31, 1987 [DE] Fed. Rep. of Germany ....... 3710803

[51] Int. Cl.$^4$ .............................................. C08G 69/46
[52] U.S. Cl. .................................... 528/500; 528/323; 528/324; 528/499
[58] Field of Search ............................... 528/500, 499

[56] References Cited

U.S. PATENT DOCUMENTS 3,931,130  1/1976  Beining et al. ...................... 528/500

FOREIGN PATENT DOCUMENTS 2340261  3/1975  Fed. Rep. of Germany ...... 528/500
1294019  2/1958  German Democratic Rep. ..................................... 528/500

Primary Examiner—Harold D. Anderson
Assistant Examiner—T. Mason
Attorney, Agent, or Firm—Keil & Weinkauf

[57] ABSTRACT

Caprolactam and oligomers thereof are removed from nylon granules containing same in a process wherein
(a) nylon granules are introduced at not less than 100° C. at the top of a substantially upright treatment zone,
(b) nylon granules are passed downward through the treatment zone while being heated to from 130° to 210° C.,
(c) superheated steam is passed at from 130° to 210° C. upward through the treatment zone,
(d) dry nylon granules are withdrawn at the bottom end of the treatment zone and steam containing caprolactam and oligomers thereof is withdrawn at the top of the treatment zone,
(e) the caprolactam and oligomers thereof containing steam thus obtained is passed through a column giving an aqueous solution of caprolactam and oligomers thereof as bottom product and virtually caprolactam-free steam as overhead product.

5 Claims, No Drawings

REMOVAL OF CAPROLACTAM AND OLIGOMERS THEREOF FROM NYLON GRANULES CONTAINING SAME

Polycaprolactam is prepared by polymerization of ε-caprolactam. In the polycaprolactam obtained, caprolactam and oligomers thereof are present in amounts for example from 8 to 11% by weight. Before further processing of the polycaprolactam it is necessary to remove the monomers and oligomers. Customarily, this is done by extraction with water at elevated temperature. However, this gives rise to dilute aqueous solutions of caprolactam which are technically complicated to work up. This also applies to nylons which are formed from caprolactam and nylon-forming diamines and dicarboxylic acids. These nylons need to be freed from caprolactam and oligomers thereof to a sufficient extent to ensure the properties required for further processing.

DD Patent 91,566 also discloses a process for removing caprolactam and oligomers thereof from nylon with simultaneous heat treatment, wherein polycaprolactam containing caprolactam and oligomers thereof is initially heated in a first zone with nitrogen in cocurrent and then treated in a second zone at elevated temperature with nitrogen in countercurrent. However, this process requires substantial gas quantities, since the partial vapor pressure of caprolactam must never be reached at the predetermined operating temperature. The process has the further disadvantage that caprolactam needs to be recovered from large quantities of inert gas.

It is an object of the present invention to provide a process for removing caprolactam and oligomers thereof from nylons containing same, in which the amount of monomeric caprolactam and oligomers thereof in the nylons is reduced to the desired level and at the same time by heat treatment, the molecular weight is increased if necessary, wherein no liquid extractants are required and the amount of gaseous extractant is relatively low and at the same time monomeric caprolactam and oligomers thereof are recovered in easily reusable form.

We have found that this object is achieved in a process for removing caprolactam and oligomers thereof from nylon granules containing same by treatment with an inert gas at elevated temperature, wherein (a) nylon granules are introduced at not less than 100° C. at the top of a substantially upright treatment zone, (b) nylon granules are passed downward through the treatment zone while being heated to from 130° to 210° C., (c) superheated steam is passed at from 130° to 210° C. upward through the treatment zone, (d) dry nylon granules are withdrawn at the bottom end of the treatment zone and steam containing caprolactam and oligomers thereof is withdrawn at the top of the treatment zone, (e) the caprolactam and oligomers thereof containing steam thus obtained is passed through a column giving an aqueous solution of caprolactam and oligomers thereof as bottom product and virtually caprolactam-free steam as overhead product.

The novel process has the advantage that the proportion of caprolactam and oligomers thereof in the nylon granules is reduced in a simple manner to the desired level. Another advantage of the novel process is that relatively small amounts of steam are required and that caprolactam and oligomers thereof are obtained in as easily reusable form. A further advantage of the novel process is that the nylon granules are at the same time dried and heat-treated.

Suitable nylons are polycaprolactam or copolyamides composed of caprolactam and further nylon-forming starting materials, the proportion derived from caprolactam being preferably not less than 20% by weight, in particular not less than 25% by weight. Preferred nylon-forming starting materials are diamines and dicarboxylic acids suitable for forming nylons. Suitable dicarboxylic acids are for example alkanedicarboxylic acids of 6 to 12 carbon atoms, in particular of 6 to 10 carbon atoms, terephthalic acid and isophthalic acid. Suitable diamines are for example alkanediamines of 4 to 12, in particular 6 to 8, carbon atoms, and also m-xylylenediamine, bis(4-aminophenyl)methane, bis(4-aminophenyl)-2,2-propane or bis(4-aminocyclohexyl)methane. The dicarboxylic acids and the diamines can each for themselves be used in any desired combination, but in relation to each other they are advantageously present in an equivalent ratio. Of particular industrial importance are polycaprolactam and nylons composed of caprolactam, hexamethylenediamine and also adipic acid, isophthalic acid and/or terephthalic acid.

The nylons used may additionally contain customary additives such as delusterants, for example titanium oxide, nucleating agents, for example magnesium silicate, stabilizers, for example copper(I) halides and alkali metal halides, antioxidants and also reinforcing agents in customary amounts. The additives are generally added before granulation before, during or after polymerization.

Nylon granules are introduced at not less than 100° C. at the top of a substantially upright treatment zone. The starting material generally comprises nylon granules containing from 2 to 15% by weight of caprolactam and oligomers thereof, in particular from 8 to 12% by weight of caprolactam and oligomers thereof. In general, the nylon granules are from $1.5 \times 1.5$ mm to $4 \times 4$ mm in size and have a water content from 0.5 to 3% by weight. Advantageously, the nylon granules are introduced at the top of the treatment zone at from 100 to 150° C., in particular at from 105 to 120° C. In practice, this is accomplished by heating the feedline for the nylon granules with the superheated steam used or by performing the heating up with a suitable heat exchanger or by carrying out the granulation in such a way as to produce nylon granules having a temperature above 100° C. The treatment zone generally has a length:diameter ratio from 7:1 to 15:1. The residence time of the nylon granules in the treatment zone ranges for example from 20 to 60 hours, in particular 25 to 50 hours.

The nylon granules are passed downward through the treatment zone while being heated to from 130° to 210° C., in particular from 160° to 190° C. Advantageously, a temperature from 20° to 60° C. below the melting point of the particular nylon is maintained. The nylon granules pass through the treatment zone under the force of gravity at the rate of withdrawal of nylon granules at the bottom end of the treatment zone. It will be readily understood that nylon granules are fed in at the top at the same rate.

Superheated steam is passed downward through the treatment zone at from 130° to 210° C., in particular at from 160° to 190° C. The superheated steam heats the nylon granules to the desired temperature and removes monomeric caprolactam, oligomers thereof and adherent water. Advantageously, from 2 to 10, in particular from 2.5 to 8, kg of superheated steam are used per kg of nylon granules per hour. Advantageously, a pressure from 1.05 to 1.1 bar is maintained in the treatment zone. It will be readily understood that the conditions are mutually adapted in such a way that water is not present in liquid phase.

At the bottom end of the treatment zone, dry nylon granules having for example a water content of less than 0.5% by weight, in particular from 0.2 to 0.04% by weight, are withdrawn, advantageously after cooling down to room temperature, for example by way of a lock, at the rate of nylon granules inflow at the top. At the top end of the treatment zone, steam containing caprolactam and oligomers thereof is withdrawn.

The caprolactam and oligomers thereof containing steam thus obtained is passed through a column to give an aqueous solution of caprolactam and oligomers thereof as bottom product and virtually caprolactam-free steam as overhead product. The aqueous solution obtained at the base of the column generally contains from 50 to 80% by weight, in particular from 60 to 70% by weight, of caprolactam and oligomers thereof. This solution is conveniently left as it is, or advantageously concentrated to a content of over 90% by weight, and returned without further purification into the polymerization of caprolactam in the precondensation pipe. It is advantageous to use a column having from 5 to 15 theoretical plates, for example a bubble cap column, a packed column or a sieve plate column. At the base of the column the temperature is advantageously kept at from 95° to 120° C. and at the top of the column at from 120° to 150° C. Advantageously, a pressure from 1.01 to 1.03 bar is maintained in the column.

Advantageously, the steam obtained as overhead product from the column is reheated to from 130° to 210° C. and returned into the treatment zone. It has also proved of good utility if the steam used contains <10 ppm, in particular <5 ppm, of molecular oxygen.

The process according to the invention makes it possible, by variation of the steam flow rate, of the temperature and of the residence time as a function of the extractables content of the starting nylon, to set a monomer content suitable for the particular end-use of the nylon. For instance, it is possible to produce industrially interesting products containing for example from 7 to 8% by weight of extractables for specific monofilaments or from 0.5 to 1.2% by weight of extractables for fibers or foams. The nylons treated according to the invention have a particularly good utility in practice as regards the low levels of monomeric and dimeric caprolactam.

The process according to the invention is illustrated in the Examples below.

EXAMPLE 1

The upright tubular extraction apparatus used has a conical taper and an outlet at the bottom end and, at the top end, a feed pipe for polycaprolactam granules which protrudes into the extraction tube to 25% of the length of the extraction tube. The extraction tube further has at the bottom end a feed for superheated steam and at the top end an outlet therefor. Per hour, 3.3 kg of moist caprolactam granules having an extractables content of 10.5% by weight (monomeric caprolactam and oligomers) and a K value of 70 are introduced at the top. In passage through the feed pipe section which extends into the extraction tube the polycaprolactam granules are heated by the superheated steam to 120° C. and then enter the extraction tube. At the bottom end, 10 kg of superheated steam at 180° C. are introduced per hour; this steam heats the downward moving granules to from 170° C. (at the bottom) to 165° C. (at the top). At the bottom conical end, extracted polycaprolactam granules having a residual extractables content of from 1.3 to 1.7% by weight, a residual moisture content <0.1% by weight and a K value from 74 to 76 are withdrawn via a nitrogen-charged downpipe. The caprolactam and oligomers thereof containing steam emerging at the top end of the extraction tube is passed in at the base of a column having 10 theoretical plates. The top of the column is maintained at 105° C. and the base of the column at 98° C. The hourly bottom product comprises 400 g of an aqueous solution containing 70% by weight of caprolactam and oligomers thereof. The top of column product is steam containing <0.5% by weight of caprolactam. This steam is if necessary replenished and heated to 180° C. and then returned into the extraction tube.

EXAMPLE 2

The extraction apparatus described under Example 1 is fed per hour with 3.5 kg of moist nylon granules, prepared from caprolactam and terephthalic acid/hexamethylenediamine in a weight ratio of 3:7, having an extractables content of 3.7% by weight (monomeric caprolactam and oligomers) and a K value of 56.0. The polymer granules are introduced into the extraction tube and treated with 10 kg of superheated steam is countercurrent, both steps being carried out as in Example 1. The steam has a temperature of 205° C. and heats the downward moving granules to from 198° to 202° C. The granules are discharged as described in Example 1. The residual extractables content in the discharge granules is from 0.3 to 0.4% by weight, the residual moisture content <0.1% by weight and the K value in the range from 66.0 to 68.0. The mixture of vapors emerging at the top end of the tube is separated in a column as described in Example 1. The hourly bottom product of the column comprises 170 g of an aqueous solution containing 70% by weight of caprolactam and oligomers thereof. As in Example 1, the steam is heated up again, to 203° C., and returned into the extraction tube.

We claim:
1. A process for removing caprolactam and oligomers thereof from nylon granules containing same, wherein
   (a) nylon granules are introduced at not less than 100° C. at the top of a substantially upright treatment zone,
   (b) nylon granules are passed downward through the treatment zone while being heated to from 130° to 210° C.,
   (c) superheated steam is passed at from 130° to 210° C. upward through the treatment zone,
   (d) dry nylon granules are withdrawn at the bottom end of the treatment zone and steam containing caprolactam and oligomers thereof is withdrawn at the top of the treatment zone,
   (e) the caprolactam and oligomers thereof containing steam thus obtained is passed through a column giving an aqueous solution of caprolactam and oligomers thereof as bottom product and virtually caprolactam-free steam as overhead product.

2. A process as claimed in claim 1, wherein a residence time from 25 to 50 hours in the treatment zone is maintained for the nylon granules.

3. A process as claimed in claim 1, wherein superheated steam at from 160° to 180° C. is used.

4. A process as claimed in claim 1, wherein from 2 to 10 kg of superheated steam are used per kg of nylon granules per hour.

5. A process as claimed in claim 1, wherein the steam obtained at the top of the column is heated to from 130° to 210° C. and returned into the treatment zone.

* * * * *